(12) United States Patent
Meyr et al.

(10) Patent No.: US 6,717,732 B2
(45) Date of Patent: Apr. 6, 2004

(54) VEHICLE REAR-VIEW MIRROR AND METHOD OF MAKING SAME

(75) Inventors: Wolfgang Meyr, Munich (DE); Joseph Laux, Haar (CH); Helmut Piringer, Blumenstr. 2a, Baldham (DE)

(73) Assignees: Bayerische Motoren Werke Aktiengesellschaft, Munich (DE); Helmut Piringer, Baldham (DE)

(*) Notice: Subject to any disclaimer, the term of this patent is extended or adjusted under 35 U.S.C. 154(b) by 9 days.

(21) Appl. No.: 10/225,471

(22) Filed: Aug. 22, 2002

(65) Prior Publication Data

US 2003/0058540 A1 Mar. 27, 2003

(30) Foreign Application Priority Data

Aug. 22, 2001 (DE) .......................................... 101 41 047

(51) Int. Cl.$^7$ ................................................ G02B 1/10
(52) U.S. Cl. ...................... 359/584; 359/589; 359/885; 359/577; 359/603; 362/494; 362/510; 362/135
(58) Field of Search .................. 359/584, 589, 359/590, 884, 885, 577, 603, 614; 362/494, 510, 293, 135

(56) References Cited

U.S. PATENT DOCUMENTS 4,352,006 A 9/1982 Zega .......................... 219/219
5,267,081 A * 11/1993 Pein .......................... 359/584
5,844,721 A * 12/1998 Karpen ....................... 359/603
6,196,688 B1 3/2001 Caskey et al.

FOREIGN PATENT DOCUMENTS

| DE | 37 44 312 | 12/1986 |
| DE | 39 41 859 | 1/1991 |
| DE | 41 22 555 | 1/1993 |
| EP | 0438646 | 7/1991 |
| EP | 0 482 933 | 4/1992 |
| EP | 0 725 286 | 8/1996 |
| EP | 0999574 | 5/2000 |
| JP | 59216101 | 12/1984 |
| JP | 02285339 | 11/1990 |

OTHER PUBLICATIONS

Search Report

* cited by examiner

*Primary Examiner*—Drew Dunn
*Assistant Examiner*—Leo Boutsikaris
(74) *Attorney, Agent, or Firm*—Crowell & Moring LLP

(57) ABSTRACT

A vehicle rear-view mirror has a light-transmitting filtering layer for filtering out interfering fractions of the light entering the filtering layer in the yellow spectral range. The mirror includes an interference reflector which has a plurality of thin layers for the reflection of the light impinging on the mirror. The degree of reflection of the interference reflector is less in the yellow spectral range than in the green and/or red wavelength range.

34 Claims, 4 Drawing Sheets

VEHICLE REAR-VIEW MIRROR AND METHOD OF MAKING SAME

BACKGROUND AND SUMMARY OF THE INVENTION

This application claims the priority of prior German application 101 41 047.6, filed Aug. 22, 2001 the disclosure of which is expressly incorporated by reference herein.

The invention relates to a mirror, particularly a vehicle rear-view mirror, having a light-transmitting filtering layer for filtering out interfering fractions of the light entering the filtering layer in the yellow spectral range.

The spectral sensitivity of the human eye, that is, the sensitivity to light of different wavelengths, depends on the radiant flux density of the light impinging on the eye. At low radiant flux densities (night vision), the spectral maximum of the sensitivity curve is situated at smaller wavelengths than in light conditions during a normal bright day (day vision). Nevertheless, even in night vision, the eye is sensitive to light in the yellow spectral range.

It is known that light in the yellow spectral range has an interfering effect on the visual perception. This applies particularly to the visual perception of driving situations by means of a vehicle rear-view mirror when driving a motor vehicle at night or under similar light conditions.

U.S. Pat. No. 5,844,721 explains this phenomenon in detail. This document also describes a rear-view mirror with a light-transmitting glass layer which, for filtering out yellow light, contains neodymium oxide of a weight fraction of 5 to 20 percent. The thickness of the glass layer amounts to from 0.5 to 4 mm. According to U.S. Pat. No. 5,844,721, in this manner, 95 to 98 percent of the light with wavelengths of between 565 and 595 nm can be filtered out when the glass layer has a thickness of 3.39 mm. Viewed from the mirror surface, on which the light to be reflected is impinging, a reflection layer made of silver is arranged behind the glass layer for reflecting the light which has impinged on the mirror and has passed through the glass layer.

The disadvantage of such a mirror is the thickness of the glass layer of at least 0.5 mm. Particularly in the edge area of the mirror, such thicknesses result in blurred contours and/or double contours of the mirror images. Furthermore, the expenditures for the production of thick glass layers are relatively high.

It is an object of the present invention to expand the possibilities for producing a mirror of the initially mentioned type.

An important idea of the present invention is the combination of a light-transmitting filtering layer for filtering out interfering fractions of the light entering the filtering layer in the yellow spectral range by means of an interference reflector, the interference reflector having a plurality of thin layers for the reflection of the light impinging on the mirror, and the degree of reflection of the interference reflector in the yellow spectral range being lower than in an adjoining wavelength range with smaller wavelengths. The degree of reflection of the interference reflector in the yellow spectral range is preferably lower than in the entire green spectral range.

In a contemplated embodiment, in the wavelength range from 450 to 550 nm, particularly between 480 and 520 nm, the interference reflector has a degree of reflection maximum, and the degree of reflection decreases starting at the maximum to beyond the yellow spectral range. This can be achieved, for example, by a suitable coordination and selection of the number and/or the materials and/or of the layer thicknesses of the thin layers of the interference reflector. The layers are considered thin particularly when the light impinging on the interference reflector, because of the small layer thickness, is absorbed only to a negligibly small fraction, so that the sum of the degree of reflection and of the degree of transmission for each wavelength of the visible light amounts to approximately 1. Such interference layers typically have a layer thickness which is clearly smaller than the wavelength of the visible light. For example, the optical thickness of at least one of the interference layers amounts to one fourth of a wavelength of light in the range from 460 to 540 nm, particularly one fourth of the wavelength at which the reflection degree maximum is situated. Such layers can be easily reproduced by means of processes known per se, such as sputtering processes or thermal evaporation processes and can be deposited on a substrate while the layer thickness is uniform.

An advantage of the present invention relates to the fact that the endeavored extinction of the interfering fractions in the yellow spectral range does not have to be achieved only by an absorption in the filtering layer. On the contrary, the interference reflector contributes to a mirror image which can be easily perceived also under poor light conditions in that it reflects selectively. As a result, the layer thickness of the filtering layer can be reduced in comparison to the glass layer described in U.S. Pat. No. 5,844,721. In a preferred embodiment, the filtering layer therefore has a layer thickness of less than 0.5 mm. Particularly when the filtering layer is a glass layer, the manufacturing expenditures are therefore reduced. In contrast to thick glass layers, thin glass layers can be cut by means of customary laser tools. Also, in the case of laser-cut glass layers, an otherwise required beveling of the edge can be eliminated because the cut edges can be constructed correspondingly. In addition, mirror layers which are plane at first are frequently deformed in the further course of the manufacturing process in order to produce a mirror with a curved surface. The deforming of thin glass layers requires significantly less energy and lower expenditures. For example, a thin glass layer can be bent such that it adapts to the contour of a mold which adjoins on one side and which is used for the deformation. The mold can be used for heating the glass layer. After the cooling, the glass layer will then retain its curvature.

However, the invention is not limited to the use of glass layers as filtering layers. For example, as an alternative or in addition, a transparent plastic material, such as a suitable silicone rubber, can be used as the basic material for the filtering layer. In addition to the filtering-out of the interfering light fractions, the plastic material can also take over additional functions of the mirror, for example, the holding of additional mirror layers or the connecting of materials to opposite sides of the plastic layer and/or the sealing-off against a penetration of air and/or moisture.

In a further development, the mirror has an absorption layer for absorbing light which has penetrated the interference reflector, the absorption layer in the visible wavelength range having an average degree of reflection of less than 0.08, particularly 0.03 to 0.05. The absorption layer therefore absorbs the largest fraction of the impinging light and largely prevents a reflection of the yellow light not reflected by the interference reflector. Particularly when the degree of reflection of the interference reflector in the wavelength range of the green and/or red light is clearly lower than 1, by absorbing red or green light, the absorption layer contributes to the fact that an observer of the mirror receives an easily perceptible image. The reason is that, if these fractions were reflected, when the reflection is directed, blurry contours and/or multiple contours could occur for the observer. In the case of a diffuse reflection, the contrast of the light reflected by the interference reflector would not be sufficiently pronounced in comparison to the light reflected in the background.

In particular, the interference reflector has only three thin layers, for example, a center layer which is embedded between two outer layers, the outer layers having a higher refractive index than the embedded center layer. The center layer may be a silicon oxide layer, particularly with $SiO_2$. Although, when only three thin layers are used, this does not result in the same design possibilities of the reflection behavior as when more layers are used, because of the absorption layer, the contrast is sufficiently pronounced also in the case of degrees of reflection clearly lower than 1 which can typically be achieved by means of three layers.

In a particularly preferred further development, the mirror has an illumination device by means of which the mirror background can be illuminated which is defined by the combination of the filtering layer and the interference reflector, so that light generated by the illumination device exits from the mirror surface. The mirror preferably has a control device for controlling the luminosity of the illumination device. Thus, the contrast of the light reflected by the interference reflector with respect to the light coming out of the mirror background can be changed. The effect on a viewer of the mirror is comparable to a change of the intensity of the light reflected by the interference reflector. This dimming effect can therefore be utilized for reducing the blinding effect of intensive light impinging on the mirror surface. For example, the intensive light is detected and the contrast is then reduced. Particularly when used in street/highway traffic, the mirror can therefore increase driving safety.

The above-described absorption layer is preferably provided in combination with the illumination device, in which case, viewed from the mirror surface, the light exit of the illumination device is arranged behind the absorption layer and the absorption layer is transmitting at least for a small fraction of the light generated by the illumination device. In particular, in the visible wavelength range, the degree of transmission amounts to more than 0.1, preferably more than 0.25.

The invention will now be explained in the manner of an example by means of the attached drawing. However, it is not limited to the described examples and embodiments.

Other objects, advantages and novel features of the present invention will become apparent from the following detailed description of the invention when considered in conjunction with the accompanying drawings.

DETAILED DESCRIPTION OF THE INVENTION

Figure 6:
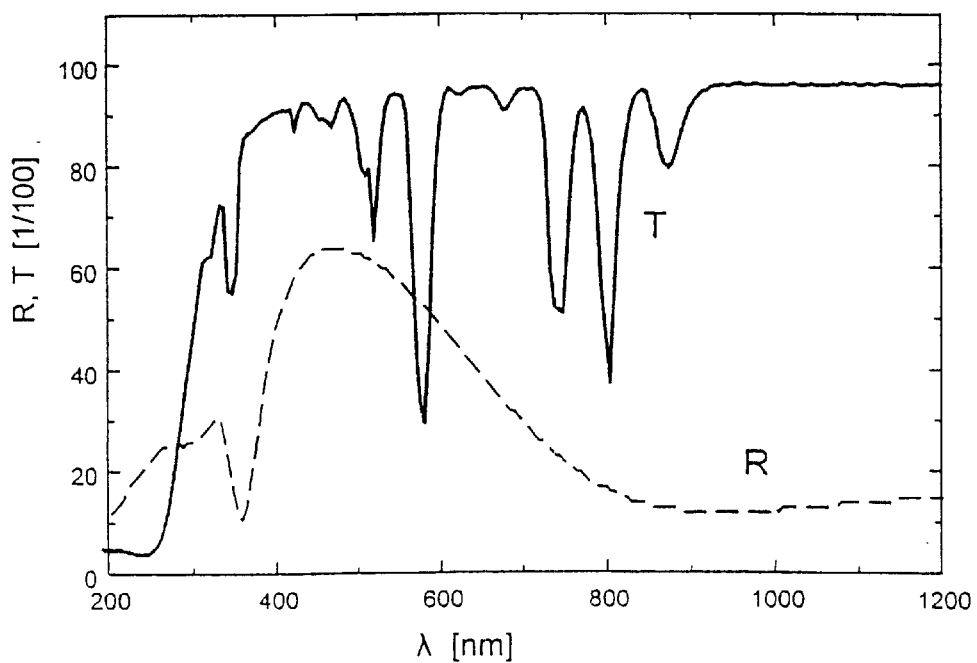
FIG. 6 is a graph showing the degree of transmission of a filtering layer and of the degree of reflection of an interference reflector as a function of the wavelength.

FIG. 6 illustrates the degree T of transmission of a glass layer doped with neodymium oxide and having a layer thickness of 0.5 mm. At a weight fraction of 10%, the neodymium oxide is uniformly distributed in the glass layer. The effect of the absorption of the neodymium in the yellow spectral range (approximately 568 to 590 nm wavelength) is clearly indicated, in which the degree of transmission is reduced to approximately 0.3. Furthermore, the broken line in FIG. 6 shows the degree R of reflection of an interference reflector which has a silicon oxide layer embedded between two titanium oxide layers. The layer thickness of the two titanium oxide layers amounts to approximately 50 nm, at a refractive index of approximately 2.4. The layer thickness of the silicon oxide layer amounts to approximately 22 nm, at a refractive index of approximately 1.5. In the case of a wavelength of approximately 480 nm, the degree of reflection has a maximum of approximately 0.63. Starting from this maximum, the degree of reflection decreases continuously with an increasing wavelength to beyond the yellow wavelength range.

As an alternative, the interference reflector, which can be used for the construction of a mirror according to the invention, has an $SiO_2$ layer embedded between two outer layers, which $SiO_2$ layer has a different, particularly a larger layer thickness than 22 nm.

As a result of the selection of the thickness of the $SiO_2$ layer, the position of the degree of reflection maximum of the interference reflector can be adjusted. The larger the layer thickness, the greater the wavelength at which the maximum is situated, in which case the precise position of the maximum is valid only for a certain path which light cover inside the interference reflector, or is valid only for a direction of incidence, for example, for light which impinges perpendicularly on the surface of the interference reflector. The values mentioned above in connection with FIG. 6 refer to the perpendicular incidence of the light.

The two layers, which embed the $SiO_2$ layer or another suitable layer, preferably have a clearly greater refractive index than the embedded layer; for example, a refractive index which is at least by 0.5 greater. The embedding layers preferably both consist of the same material and have the same thickness. The material may have an oxide. It may exhibit a metallic or a dielectric behavior.

In FIGS. 1 to 5, the same reference numbers indicate layers which can be produced from the same material.

Figure 1:
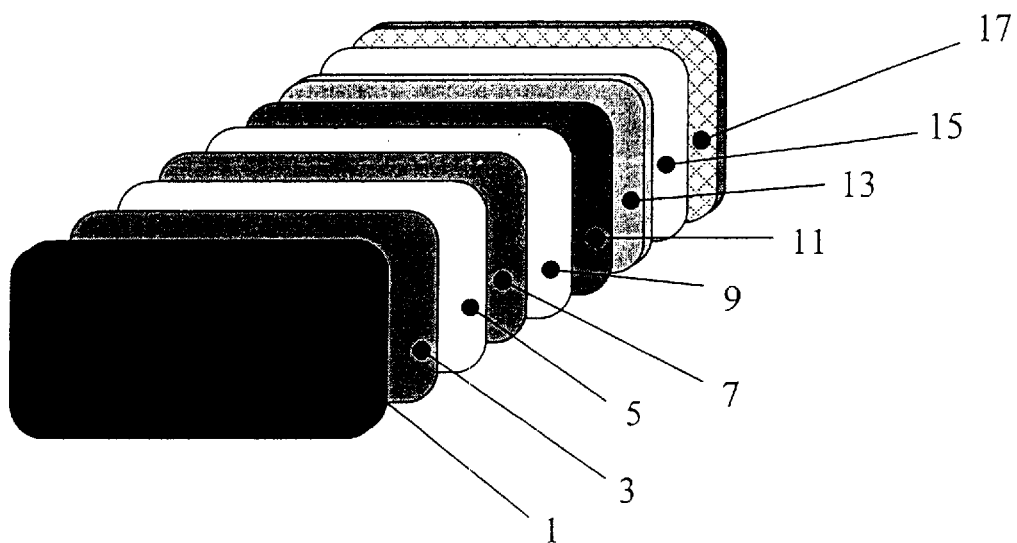
FIGS. 1 to 4 are respective perspective exploded views of various combinations of mirror layers, constructed according to preferred embodiments of the invention.

FIG. 1 is an exploded view of the construction of a preferred embodiment of a mirror. A glass 1 containing a neodymium layer (abbreviated: Nd glass) forms the mirror surface on which the light to be reflected impinges and from which reflected light exits. In combination of oxygen, the neodymium is preferably uniformly distributed in the glass layer 1 as $Nd_2O_3$. In particular, the glass layer 1 has a layer thickness in the range of from 0.25 to 0.35 mm. Adjoining the glass layer 1, an interference reflector which has three partial layers 3, 5, 7 is provided. Layer 5 consists of $SiO_2$. Layers 3, 7 consist of $TiO_2$. The interference reflector particularly has the characteristics described in connection with FIG. 6. The interference reflector is connected with an absorption layer 11 by way of a layer 9. Layer 9 consists of a transparent silicone rubber. Viewed from the mirror surface, a background illumination 13 is arranged behind the absorption layer 11, which background illumination is preferably capable of emitting light uniformly distributed over the background defined by the glass layer 1, the interference reflector and the layer 9 in the direction of the mirror surface. A second silicone rubber layer 15 adjoins the back side of the background illumination 13. Behind the second silicone rubber layer 15, in turn, a carrier plate 17 is situated, preferably having a heating device for heating the mirror.

In particular, the silicone rubber layers are produced from SilGel 612 by the firm Wacker-Chemie GmbH, München, Germany. SilGel 612 has the characteristic of adhering very well to a plurality of materials, particularly to glass. It can therefore be used for connecting the other layers in a stable and durable manner with the carrier plate 17. The absorption layer 11 is preferably mounted on the background illumination 13 before the assembly of the individual mirror layers. Layers 3, 5, 7 of the interference reflector are preferably also mounted on the glass layer 1 before the assembly.

During the use of a mirror according to FIG. 1, the light to be reflected impinges on the surface formed by the glass layer 1. When passing through the glass layer 1, the yellow fraction is absorbed at a high percentage, for example, by more than 60 percent, by the neodymium. The filtered light impinges on the interference reflector and is spectrally selectively reflected. The reflected fraction in the yellow spectral range is lower than in the green and/or red spectral range. The reflected light, in turn, passes through the glass layer 1, in which case the fraction of the yellow light is further reduced. The light not reflected by the interference reflector enters layer 9, partially passes through layer 9 and is, for the most part, absorbed by the absorption layer 11. Only a negligibly small percentage of the light originally impinging on the mirror is reflected by the absorption layer 11 and exits again from the mirror at the mirror surface.

For reducing the contrast, the background illumination 13 can emit light which, preferably by more than 25%, passes through the absorption layer 11 in the direction of the mirror surface. This light also impinges on the interference reflector and has to pass through the glass layer 1 before it can exist at the mirror surface. As a result, a possibly existing yellow fraction of the emitted light is effectively reduced. However, the background illumination 13 is preferably already conceived such that the fraction of the yellow light is low or negligibly small. An additional or alternative possibility consists of designing the optical characteristics of the absorption layer 11 and/or of the first silicone rubber layer 9 such that the yellow fraction is already reduced before impinging on the interference reflector.

In possible variants of the mirror illustrated in FIG. 1, no separate absorption layer 11 is provided but the first silicone rubber layer 9 and/or the background illumination 13 is designed such that light is absorbed or can pass through in the described manner.

Figure 2:
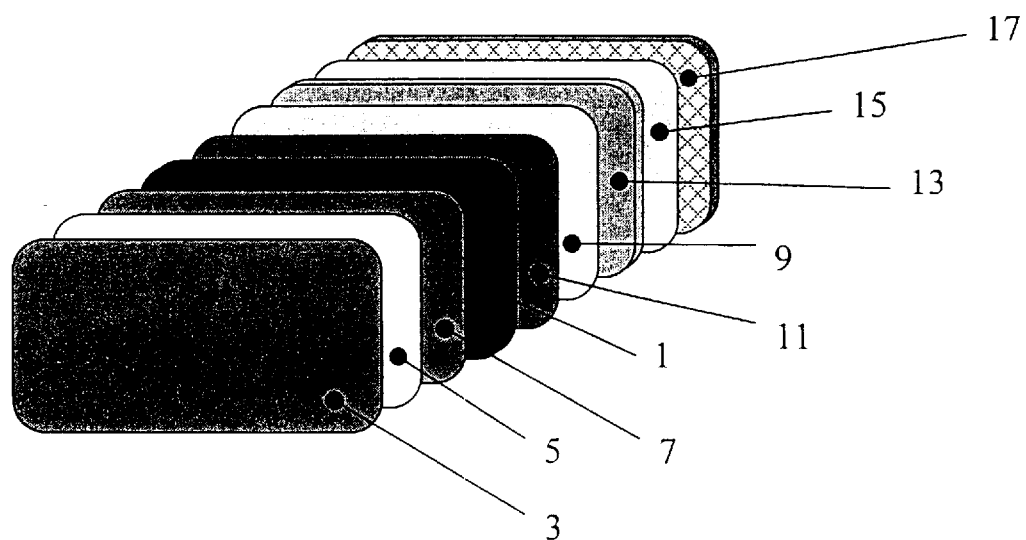

FIG. 2 shows a variant in which, viewed from the mirror surface, the glass layer 1 made of Nd glass is arranged behind the interference reflector. The effectiveness of this variant with a view to filtering out yellow light is based on the fact that the layers 3, 5, 7 of the interference reflector have a layer thickness which clearly is smaller than the wavelength of visible light. Therefore, the light impinging on the mirror surface and reflected by the interference reflector also enters the glass layer 1 with a certain penetration depth and is filtered.

Another difference with respect to the embodiment according to FIG. 1 consists of the fact that the absorption layer 11 is applied to the glass layer 1 before the assembly of the mirror layers and the silicone rubber layer is arranged between the absorption layer 11 and the background illumination 13.

Figure 3:
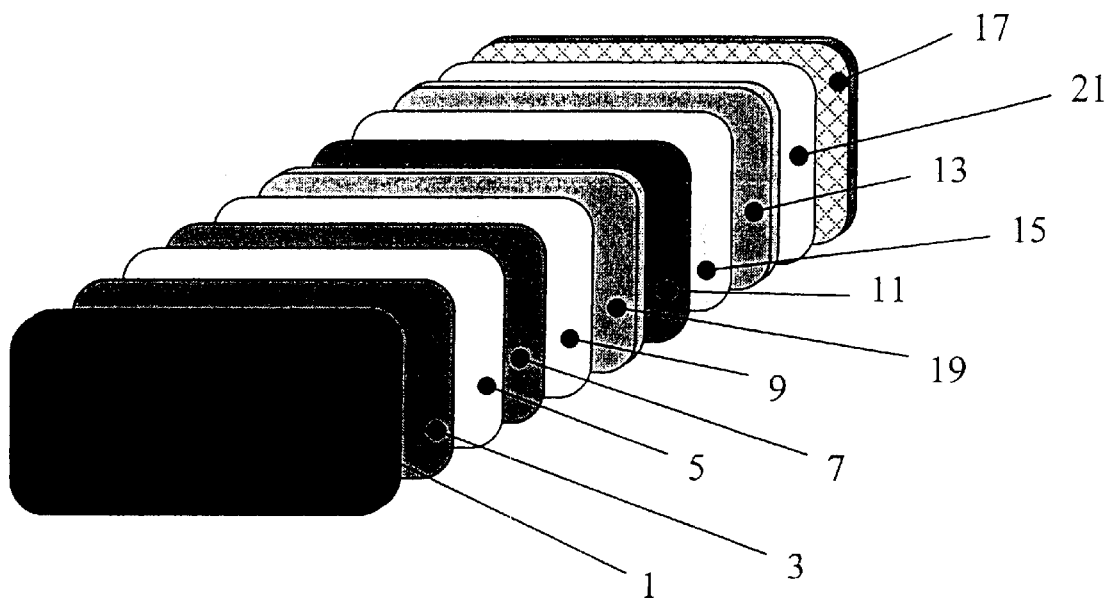

In the embodiment illustrated in FIG. 3, in comparison to the embodiment illustrated in FIG. 1, an additional glass layer 19 is provided between the first silicone rubber layer 9 and the absorption layer 11. The glass layer 19 has, for example, a layer thickness of 0.3 mm and carries the absorption layer 11. The combination of layers 19, 11 is connected on both sides by way of one silicone rubber layer 9 and 15 respectively with adjacent layers. A third silicone rubber layer 21 is arranged between the carrier plate 17 and the background illumination 13.

Figure 4:
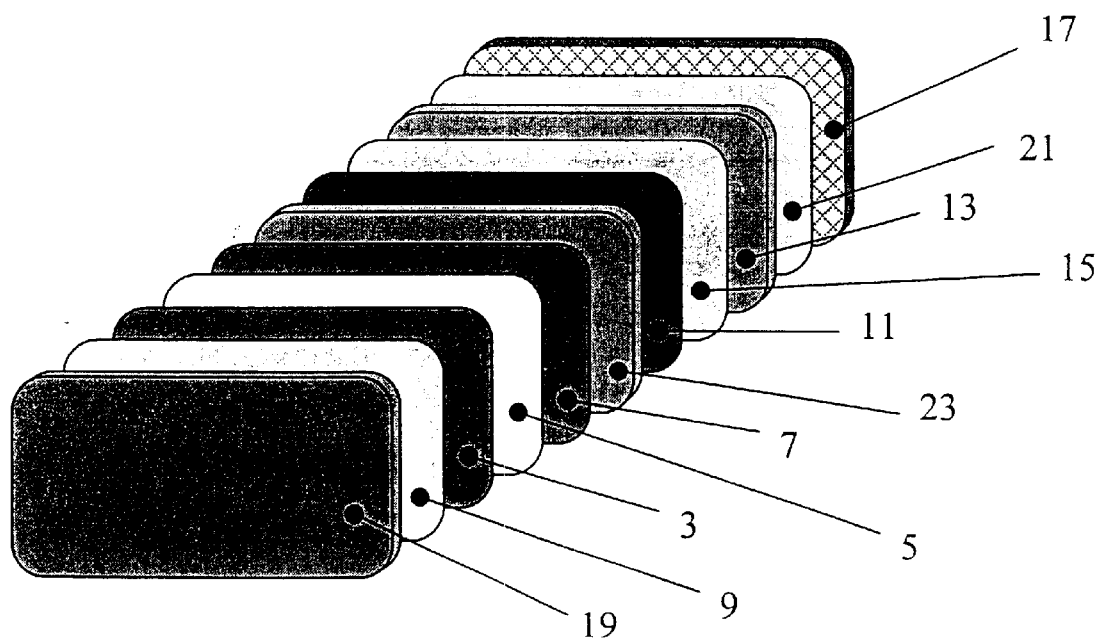

In the variant according to FIG. 4, the glass layer made of Nd glass situated on the mirror surface is replaced by a combination of a glass layer 19 and a neodymium-doped silicone rubber layer 9. The glass layer 19 forms a scratch-resistant surface layer of the mirror. The silicone rubber layer 9 is produced particularly according to the following method:

Neodymium or neodymium compound is dissolved in a solvent which can be mixed with a low-viscous silicone oil. Acetyl acetone (2,4 pentandione, aceto acetone, diacetyl methane, total formula: $C_5H_8O_2$), for example, is suitable as the solvent. Neodymium compounds soluble therein are, for example, tris (cyclopentadienyl) neodymium (III) (total formula: $(C_5H_5)_3Nd$ and neodymium (III) 2,4 pentanedionate (formula: $Nd(CH_3COCHCOCH_3)_3$). The Nd solution is then mixed with the low-viscous silicone oil, and the mixture is added to constituent A of the SilGel 612. Constituent A is then mixed with constituent B so that the SilGel 612 is formed with the neodymium distributed therein.

Figure 5:
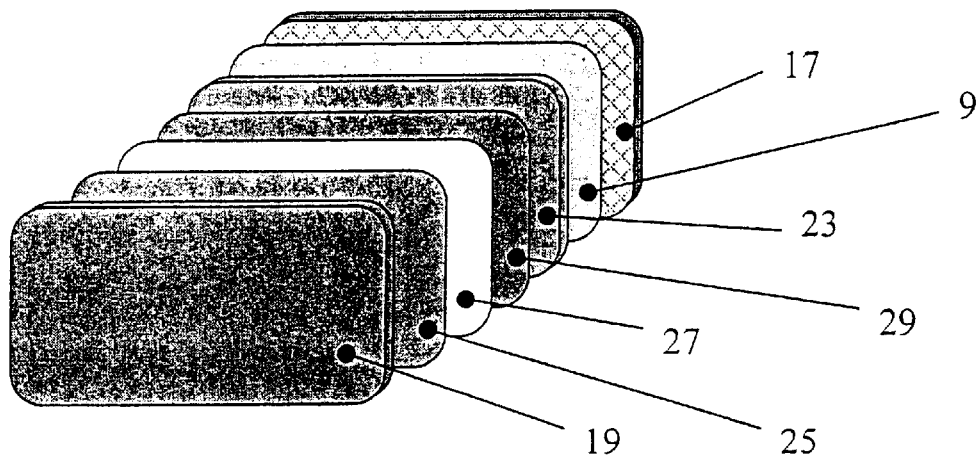
FIG. 5 is a view of a multi-layer illumination device.

FIG. 5 shows the layer construction of a background illumination, for example, of the background illumination 13 of FIGS. 1 to 4. It is arranged between two glass layers 19, 23. A first electrode, the anode 25, consists, for example, of indium tin oxide and is constructed to be so thin that light generated by the background illumination can pass through the anode 25. Viewed from the glass layer 19, behind the anode 25, a layer 27 is situated which has a light-emitting polymer, and this is followed by a second electrode—cathode 29. The background illumination may, for example, have additional partial layers, as described in the article "Foils Which Illuminate", published on Pages 22 to 26 in the journal *RESEARCH* of Bayer A G, Leverkusen, Germany, of October 1999, ISSN 0179-8618. Such light-emitting diodes have the advantage that they consist of bendable materials and may have a very thin construction. They are therefore very suitable for mirrors with a curved mirror surface.

Basically, all background illuminations known from display and flat screen technology can be used for the mirror. Light-emitting foils are particularly suitable which have electroluminescent materials, as offered, for example, by DuPont Electronic Materials under the trademark Luxprint. These light-emitting foils have a sandwich-type construction between a transparent protective foil suitable for the light exit and a second protective foil: A cathode layer made of silver or carbon paste adjoins the second protective foil. A translucent anode layer made, for example, of indium tin oxide, adjoins the transparent protective foils. A dielectric layer and an electroluminescent layer, which has an electroluminescent ink, are also situated in-between. The ink may, for example, be selected such that the light-emitting foil emits blue or white light. The protective foils are particularly polyester foils. The light-emitting foils are flexible and can therefore adapt to the curved surfaces of adjacent mirror layers. They can be glued to the additional mirror layers, for example, by using SilGel 612 or another silicone rubber.

Figure 7:
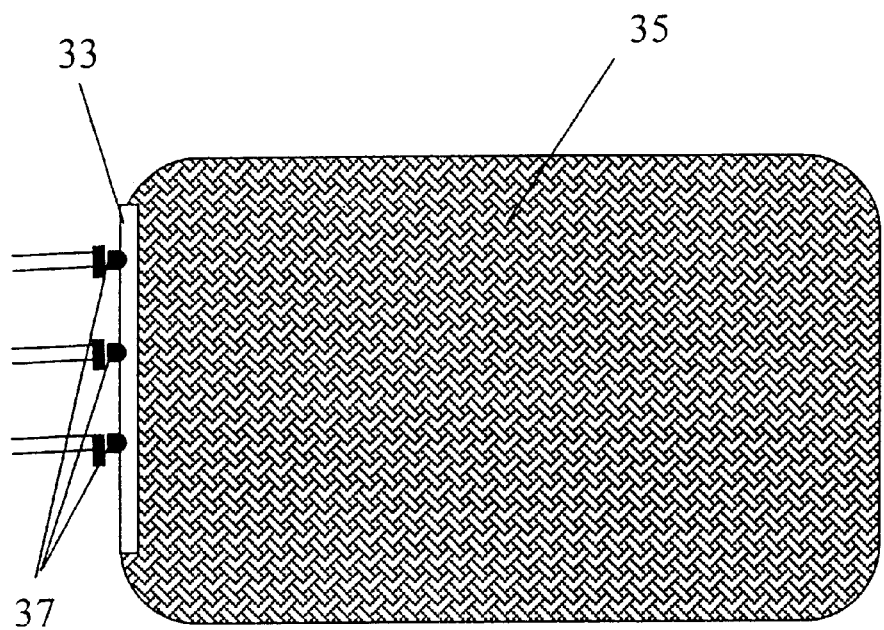
FIG. 7 is a view of an illumination device.
Figure 8:
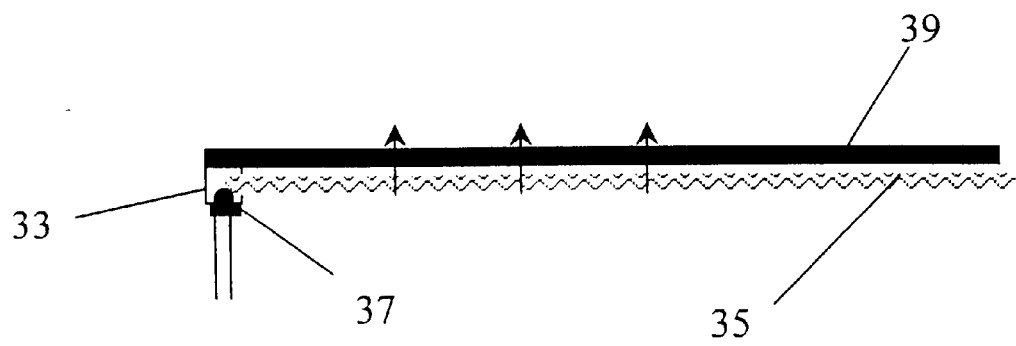
FIG. 8 is a sectional view of the illumination device according to FIG. 7.

As another variant of a background illumination, an arrangement is suggested which is described in detail by means of FIGS. 7 and 8. A plurality of light-emitting diodes 37, which are illustrated in the figures only schematically with respect to their position, number and size, are used as the light source. The light emitted by the light-emitting diodes 37 is coupled into a light guide 33 which guides the light along an edge of a light distributor 35 and, distributed over the edge, couples it into the light distributor 35. The light distributor 35 distributes the coupled-in light over its entire cross-sectional surface and, distributed over the cross-sectional surface, causes it to exit at its surface. In order to be able to do so, the light distributor 35 has a structured surface with elevations distributed approximately uniformly over the surface and culminating in narrow edges. The effect of the conducting of light within the light distributor 35 and of the exiting of light out of the light distributor 35 is comparable with the conditions in considerably bent or buckled glass fibers. When the light guided within the material impinges at a large angle with respect to the normal surface line from the inside on the surface, the light is totally reflected. When, in contrast, the light impinges on the surface at an angle smaller than the boundary angle of the total reflection, the light can exit. An example of the surface structure is schematically illustrated in FIGS. 7 and 8. The light distributor 35 is made, for example, of polycarbonate or of a light-collecting material purchasable, for example, from Bayer AG, Leverkusen, Germany. In particular, the light distributor can be produced by injection molding and has a thickness of less than 0.25 mm. The surface structure is preferably constructed as a microstructure. For this purpose, manufacturing processes as known for the production of compact disks for storing digital information, can, for example, be used.

As briefly mentioned above, different possibilities exist for constructing an absorption layer which can carry out the function of the absorption layer 11 in FIGS. 1 to 4. It may be a layer used solely for the absorption of light, or the absorption layer may also fulfill additional functions, for example, the gluing-together of adjacent layers or, particularly during the manufacturing of the mirror, the protection of one or several adjacent layers from damage, as takes place in the case of the protective foils of the above-described electroluminescent light-emitting foils. In particular, the transparent protective foil may be the absorption layer, or carry an additional absorption layer, such as a paint layer. Furthermore, a chromium oxide layer can be applied, particularly vacuum-metallized, onto a substrate, as, for example, the glass layer 1 of FIG. 2. If a silicone rubber layer, such as layer 9 in FIG. 1, is constructed as an absorption layer, the following production method is preferably used:

A liposoluble dye is dissolved in a low-viscous silicone oil, for example, in the silicone oil with the name AK 35 of the firm Wacker-Chemie GmbH, München. The silicone which is transparently dyed in this manner is added to constituent A of the SilGel 612. After constituent A is mixed with constituent B, the dyed SilGel 612 can be used as the absorption layer.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

We claim:

1. Mirror, particularly a vehicle rear-view mirror, comprising:

a light-transmitting filtering layer for filtering out interfering fractions of light entering the filtering layer in the yellow spectral range, the filtering layer containing a substance distributed therein which causes an extinction of the interfering fractions, the filtering layer being arranged such that it is situated in the beam path of the light to be reflected which impinges on the mirror, and an interference reflector having a plurality of thin layers for reflection of the light impinging on the mirror, the degree of reflection of the interference reflector in the yellow spectral range being lower than in an adjoining wavelength range with smaller wavelengths.

2. Mirror according to claim 1, wherein the interference reflector has a reflection degree maximum in a wavelength range of from 450 to 550 nm, and, starting from the maximum, the reflection degree decreases beyond the yellow spectral range.

3. Mirror according to claim 2, wherein the interference reflector has a reflecting degree maximum in a wavelength range of between 480 and 520 nm.

4. Mirror according to claim 1, wherein the interference reflector has three layers including a silicon oxide layer and two layers with a greater refractive index than the silicon oxide layer which embed the silicon oxide layer, and wherein the three layers are selected and mutually coordinated such that the degree of reflection of the interference reflector in the yellow spectral range is lower than in an adjoining wavelength range with smaller wavelengths.

5. Mirror according to claim 2, wherein the interference reflector has three layers including a silicon oxide layer and two layers with a greater refractive index than the silicon oxide layer which embed the silicon oxide layer, and wherein the three layers are selected and mutually coordinated such that the degree of reflection of the interference reflector in the yellow spectral range is lower than in an adjoining wavelength range with smaller wavelengths.

6. Mirror according to claim 3, wherein the interference reflector has three layers including a silicon oxide layer and two layers with a greater refractive index than the silicon oxide layer which embed the silicon oxide layer, and wherein the three layers are selected and mutually coordinated such that the degree of reflection of the interference reflector in the yellow spectral range is lower than in an adjoining wavelength range with smaller wavelengths.

7. Mirror according to claim 1, wherein the filtering layer has a layer thickness of less than 0.5 mm.

8. Mirror according to claim 7, wherein the filtering layer has a layer thickness in the range of from 0.25 to 0.35 mm.

9. Mirror according to claim 3, wherein the filtering layer has a layer thickness in the range of from 0.25 to 0.35 mm.

10. Mirror according to claim 4, wherein the filtering layer has a layer thickness in the range of from 0.25 to 0.35 mm.

11. Mirror according to claim 1, wherein the filtering layer consists of a silicone rubber in which the substance causing the extinction is distributed.

12. Mirror according to claim 3, wherein the filtering layer consists of a silicone rubber in which the substance causing the extinction is distributed.

13. Mirror according to claim 7, wherein the filtering layer consists of a silicone rubber in which the substance causing the extinction is distributed.

14. Mirror according to claim 4, wherein the filtering layer consists of a silicone rubber in which the substance causing the extinction is distributed.

15. Mirror according to claim 10, wherein the filtering layer consists of a silicone rubber in which the substance causing the extinction is distributed.

16. Mirror according to claim 1, wherein the mirror has an absorption layer for the absorption of light which has passed through the interference reflector, which absorption layer, in the visible wavelength range, has an average degree of reflection of less than 0.08.

17. Mirror according to claim 16, wherein the absorption layer has an average degree of reflection in the range of from 0.03 to 0.05.

18. Mirror according to claim 17, wherein the interference reflector has a reflection degree maximum in a wavelength range of from 450 to 550 nm, and, starting from the maximum, the reflection degree decreases beyond the yellow spectral range.

19. Mirror according to claim 17, wherein the interference reflector has three layers including a silicon oxide layer and two layers with a greater refractive index than the silicon oxide layer which embed the silicon oxide layer, and wherein the three layers are selected and mutually coordinated such that the degree of reflection of the interference reflector in the yellow spectral range is lower than in an adjoining wavelength range with smaller wavelengths.

20. Mirror according to claim 17, wherein the filtering layer has a layer thickness of less than 0.5 mm.

21. Mirror according to claim 1, wherein the mirror has an illumination device by which the mirror background can be illuminated, which mirror background is defined by a combination of the filtering layer and the interference reflector, so that light generated by the illumination device exits out of the mirror surface.

22. Mirror according to claim 16, wherein the mirror has an illumination device by which the mirror background can be illuminated, which mirror background is defined by a combination of the filtering layer and the interference reflector, so that light generated by the illumination device exits out of the mirror surface.

23. Mirror according to claim 21, wherein, viewed from the mirror surface, the light exit of the illumination device is arranged behind the absorption layer, and, in the visible wavelength range, the absorption layer has an average degree of transmission of more than 0.1.

24. Mirror according to claim 22, wherein, viewed from the mirror surface, the light exit of the illumination device is arranged behind the absorption layer, and, in the visible wavelength range, the absorption layer has an average degree of transmission of more than 0.1.

25. Mirror according to claim 21, wherein, viewed from the mirror surface, the light exit of the illumination device is arranged behind the absorption layer, and, in the visible wavelength range, the absorption layer has an average degree of transmission of more than 0.25.

26. Mirror according to claim 22, wherein, viewed from the mirror surface, the light exit of the illumination device is arranged behind the absorption layer, and, in the visible wavelength range, the absorption layer has an average degree of transmission of more than 0.25.

27. Method of producing a mirror, wherein a light-transmitting filtering layer, for filtering out interfering light fractions in the yellow spectral range, is combined with an interference reflector, wherein the interference reflector has a plurality of thin layers for the reflection of light, and wherein the thin layers are selected and mutually coordinated such that the degree of reflection of the interference reflector in the yellow spectral range decreases with an increasing wavelength.

28. Method according to claim 27, wherein, for producing a filtering layer of the mirror, an optically effective substance is mixed with a silicone oil, the mixture is added to a first constituent used for the production of a multi-constituent silicone rubber, and the first constituent is combined with a second constituent used for producing the multi-constituent silicone rubber, so that a light-transmitting silicone rubber is formed with the optically effective substance distributed therein.

29. A mirror comprising:

a light transmitting filtering layer operable to filter out light in a yellow spectral range, and an interference reflector formed of a plurality of layers and operable to reflect light impinging on the mirror with a degree of reflection in the yellow spectral range being lower than in adjoining smaller wavelengths.

30. A mirror according to claim 29, wherein the interference reflector has a reflecting degree maximum in a wavelength range of between 480 and 520 nm and wherein starting from the maximum, the reflection degree decreases beyond the yellow spectral range.

31. A mirror according to claim 29, wherein the interference reflector has three layers including a silicon oxide layer and two layers with a greater refractive index than the silicon oxide layer which embed the silicon oxide layer, and wherein the three layers are selected and mutually coordinated such that the degree of reflection of the interference reflector in the yellow spectral range is lower than in an adjoining wavelength range with smaller wavelengths.

32. A mirror according to claim 30, wherein the interference reflector has three layers including a silicon oxide layer and two layers with a greater refractive index than the silicon oxide layer which embed the silicon oxide layer, and wherein the three layers are selected and mutually coordinated such that the degree of reflection of the interference reflector in the yellow spectral range is lower than in an adjoining wavelength range with smaller wavelengths.

33. A mirror according to claim 29, wherein the mirror has an absorption layer for the absorption of light which has passed through the interference reflector, which absorption layer, in the visible wavelength range, has an average degree of reflection of less than 0.08.

34. A method of making a mirror according to claim 29, comprising adhesively bonding said plurality of layers to one another.

* * * * *